(12) United States Patent
Lin

(10) Patent No.: US 6,895,638 B2
(45) Date of Patent: May 24, 2005

(54) HINGE ASSEMBLY FOR NOTEBOOK COMPUTERS

(75) Inventor: Shui-Yuan Lin, Taipei (TW)

(73) Assignee: First International Computer Inc., Taipei (TW)

( * ) Notice: Subject to any disclaimer, the term of this patent is extended or adjusted under 35 U.S.C. 154(b) by 0 days.

(21) Appl. No.: 10/414,030

(22) Filed: Apr. 16, 2003

(65) Prior Publication Data

US 2003/0213101 A1 Nov. 20, 2003

(30) Foreign Application Priority Data

May 15, 2002 (TW) ........................................ 91206922 U

(51) Int. Cl.⁷ .............................................. E05D 15/00
(52) U.S. Cl. ........................ 16/368; 361/680; 361/683; 16/379
(58) Field of Search .......................... 16/368, 379, 343, 16/342, 356, 311, 337, 242, 277; 361/680–683, 801, 804; 403/83, 84, 118–120; 379/428, 433, 434

(56) References Cited

U.S. PATENT DOCUMENTS

| | | | | |
|---|---|---|---|---|
| 4,986,763 A | * | 1/1991 | Boyle ........................ 439/165 |
| 5,141,446 A | * | 8/1992 | Ozouf et al. ................. 439/165 |
| 5,363,089 A | * | 11/1994 | Goldenberg ................ 340/7.63 |
| 5,390,075 A | * | 2/1995 | English et al. .............. 361/683 |
| 5,481,430 A | * | 1/1996 | Miyagawa et al. .......... 361/681 |
| 5,490,036 A | * | 2/1996 | Lin et al. ..................... 361/680 |
| 5,629,832 A | * | 5/1997 | Sellers ........................ 361/680 |
| 5,995,373 A | * | 11/1999 | Nagai .......................... 361/755 |
| 6,091,601 A | * | 7/2000 | Schlesener et al. .......... 361/681 |
| 6,223,393 B1 | * | 5/2001 | Knopf ........................... 16/366 |
| 6,302,612 B1 | * | 10/2001 | Fowler et al. ................ 403/76 |
| 6,510,588 B2 | * | 1/2003 | Eromaki ....................... 16/308 |
| 2002/0039245 A1 | * | 4/2002 | Hong et al. ................... 360/55 |
| 2003/0006942 A1 | * | 1/2003 | Searls et al. ................. 345/1.1 |

* cited by examiner

Primary Examiner—Robert J. Sandy
Assistant Examiner—Andre' L. Jackson
(74) Attorney, Agent, or Firm—Troxell Law Office, PLLC

(57) ABSTRACT

The present invention discloses a hinge assembly for notebook computers capable of keeping a screen of a monitor connected face-to-face with a main system of the notebook, and such hinge assembly also can keep an included angle between the monitor and the main system from zero degree (i.e. closed status for stacking the monitor and the main system) to 180 degrees (i.e. horizontally aligned status of the monitor and the main system). Furthermore, the monitor can continue to be turned over until the screen of the monitor faces the back of the main system, and then further till the monitor and the main system are in the back-to-back contact with each other.

8 Claims, 5 Drawing Sheets

HINGE ASSEMBLY FOR NOTEBOOK COMPUTERS

BACKGROUND OF THE INVENTION

1. Field of the Invention

The present invention relates to a hinge assembly, more particularly to a hinge assembly for notebook computers that allows a face-to-face or a back-to-back orientation between the monitor and the main system of a notebook computer.

2. Description of the Related Art

In this modern world blooming with information technology, various high-tech products and peripherals related to computers are derived and developed rapidly, not only shortening the distance and time between people, but also making themselves indispensable to our daily life. As various information products are introduced constantly, particularly the popular use of notebook computers, the demand of using notebook computers is getting higher and higher. Whether or not a notebook computer in the future can provide a more convenient and effective service becomes an important index of evaluating if the technology of the information product manufacturers in different countries leads the world.

The portable computer in early stage has a heavy weight of about 7~14 kg and the laptop computer weighs about 4~7 kg. However the notebook computer in the present market only weighs about 1~4 kg, and the research and development of the housing, regardless the weight or volume, tends to have a compact and all-in-one design. Therefore, the all-in-one model becomes another popular name for the present portable computer. In view of the present information market, its severe competition is indescribable; numerous brands of notebook computers existing in the information market bring a huge pressure to the sales of each computer company. As to consumers, it will give more choices for selecting a humanistic, multifunctional, all-in-one notebook computer with a reasonable price, which is also an important factor to determine whether or not a major computer manufacturer can win in such a severe competition.

In general, a notebook computer as implied in the name is similar to a notebook, which can be closed or turned over to facilitate its carrying and operation. A notebook computer has a monitor and a main system, and at least a communication cable between the monitor and the main system. Further, at least one pivot is disposed between the monitor and the main system, so that the monitor can cover onto the main system at regular time, and the screen of the monitor can be rotated by means of such pivots when users want to use the notebook computer. After the screen is turned over to an appropriate position and angle, users can input information into the main system by a keyboard on the main system, so that the main system can use the communication cable to transmit such information to the monitor, and display the content of such information on the screen of the monitor.

As mentioned previously, the present notebook computer tends to be developed into a multifunctional, all-in-one, and humanistic design, therefore the present notebook computer not only has the general functions (inputting, outputting, and storing information), but also adds many additional functions such as the design of a touch-screen panel for users to input data by using fingers or a handwriting pen in addition to the traditional keyboard. However, the traditional notebook computer can only allow the closing-and-opening status between the monitor and the main system of the notebook computer. In other words, the included angle between the monitor and the main system is zero degree when the computer is closed, and generally not exceeding 180° when the computer is turned over to an appropriate position away from the main system. Therefore, the application is limited, which does not meet the requirements for the present development for the all-in-one multifunctional models. If the relative position of the monitor and the main system can be improved (for example, the face-to-face closing status is converted into a back-to-back turned over status) and can be turned over to different positions, then it will enhance the practicability of the notebook computer and meet the requirements of the present information market for the severe competitions. Such design is definitely a big leap of improvement and breakthrough, and also a big benefit to our society.

In view of the foregoing present development trend of multifunctional, all-in-one, humanistic notebook computers, the monitor and main system of conventional notebook computers can only be in a face-to-face closing status (i.e. the included angle between the monitor and the main system is zero) or rotated to an appropriate position by an axis (i.e. the included angle between the monitor and the main system does not exceeds 180°), and thus its application is limited greatly, which is also against the present all-in-one design of the notebook computer. To improve such shortcomings of the prior art, the present inventor studied and performed extensive experiments and finally invented a hinge assembly for notebook computers in accordance with the present invention.

SUMMARY OF THE INVENTION

The primary objective of the present invention is to let the monitor and main system of a notebook computer be able to have a face-to-face closing status and also a back-to-back orientation when the screen of the monitor is turned over, and a communication cable between the monitor and the main system will not have obstacles or limitation during the turnover process.

DETAILED DESCRIPTION OF THE PREFERRED EMBODIMENTS

Figure 1:
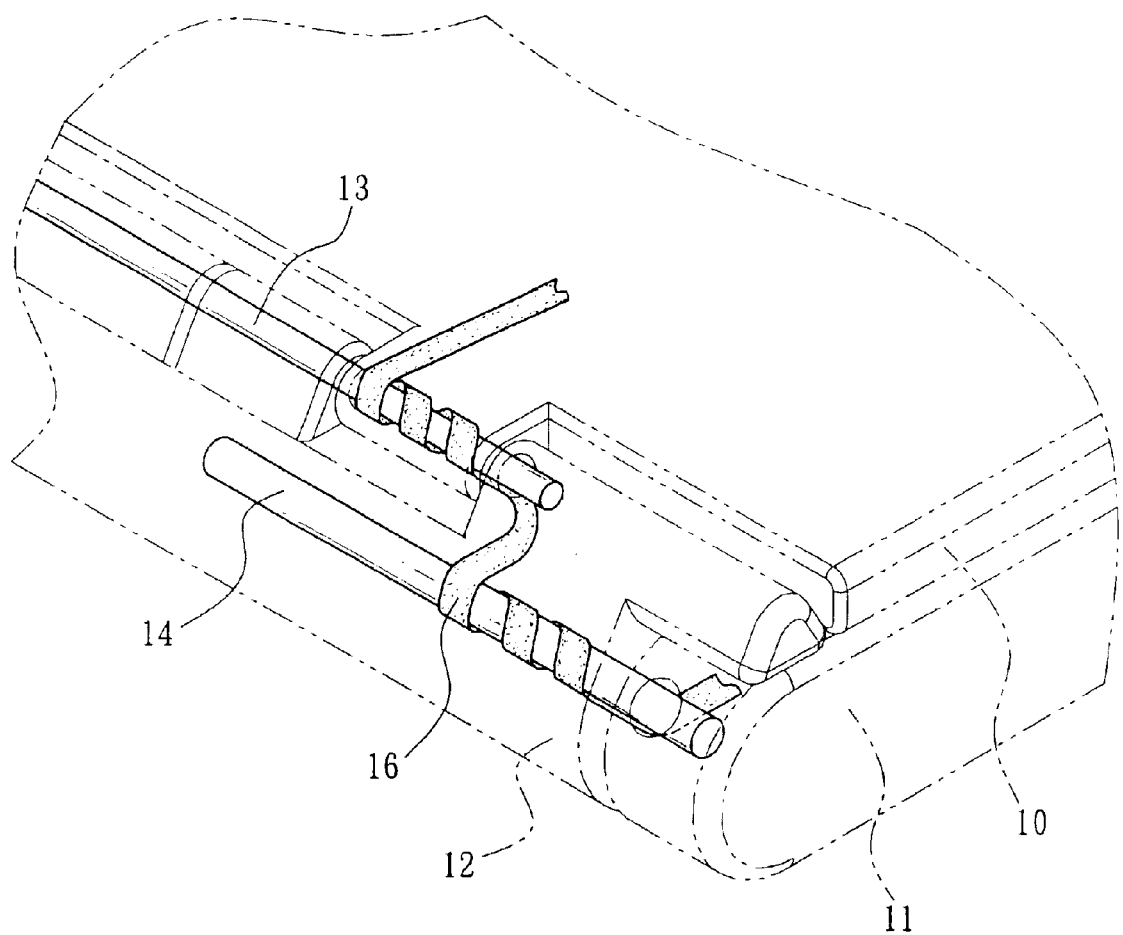
FIG. 1 is a perspective diagram of the present invention.

The present invention relates to a hinge assembly of a notebook computer. Please refer to FIG. 1 for such hinge assembly, comprising a main system 11 and a monitor 10, and a connecting body 12 disposed between the main system 11 and the monitor 10, and the connecting method is to use two independent upper pivots respectively disposed on both ends of one side of the connecting body 12 to connect the monitor 10, and both ends of another side of the connecting body 12 respectively using two independent lower pivots 14 to connect with the main system 11, wherein each upper pivot 13 and each lower pivot 14 respectively are tangled spirally by at least one communication cable, and one end of each signal line 16 is coupled to the monitor 10, and the other end coupled to the main system 11, such that messages are transmitted between the monitor 10 and the main system 11.

Figure 2:
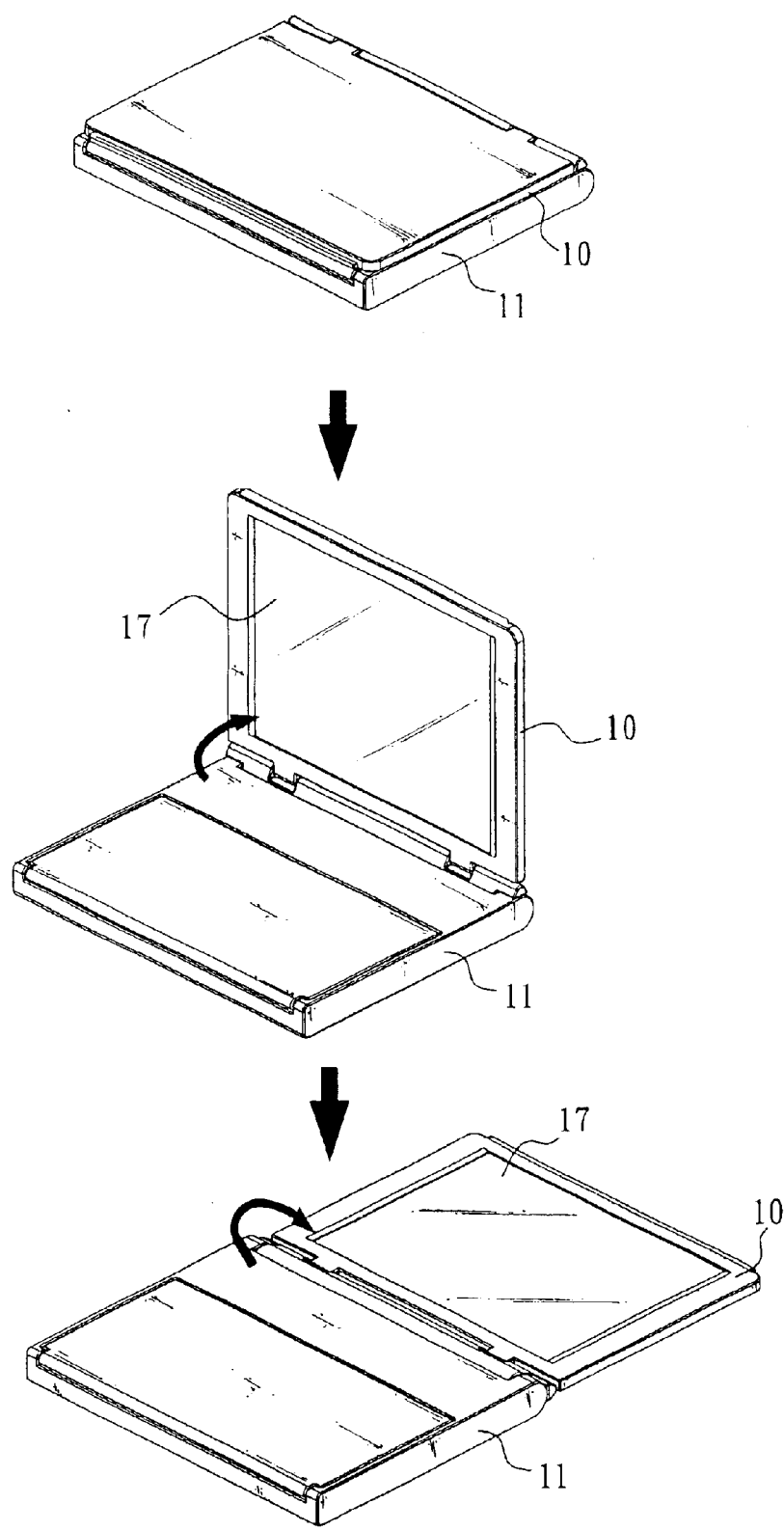
FIG. 2 is a perspective diagram illustrating the movement according to the present invention.

Please refer to FIGS. 1 and 2 for the present invention; in addition to keeping the screen 17 of the monitor 10 connected face-to-face with the main system 11, the hinge assembly also can keep an included angle between the monitor 10 and the main system 11 from zero degree (i.e. closed status for stacking the monitor 10 and the main system 11) to 180 degrees (i.e. horizontally aligned status of the monitor 10 and the main system 11). Furthermore, the monitor 10 can continue to be turned over (see FIG. 3) until the screen 17 of the monitor 10 faces the back of the main system 11, and then further till the monitor 10 and the main system 11 are in the stacked status with back-to-back contact with each other.

Therefore the largest feature of the present invention adopts the design concept of different axis; that is to adopt independent upper pivot 13 and lower pivot 14 to allow a turnover with an included angle of 360 degrees between the monitor 10 and the main system 11, so that any notebook computer installing the present invention can have larger breakthrough on its application.

Figure 3:
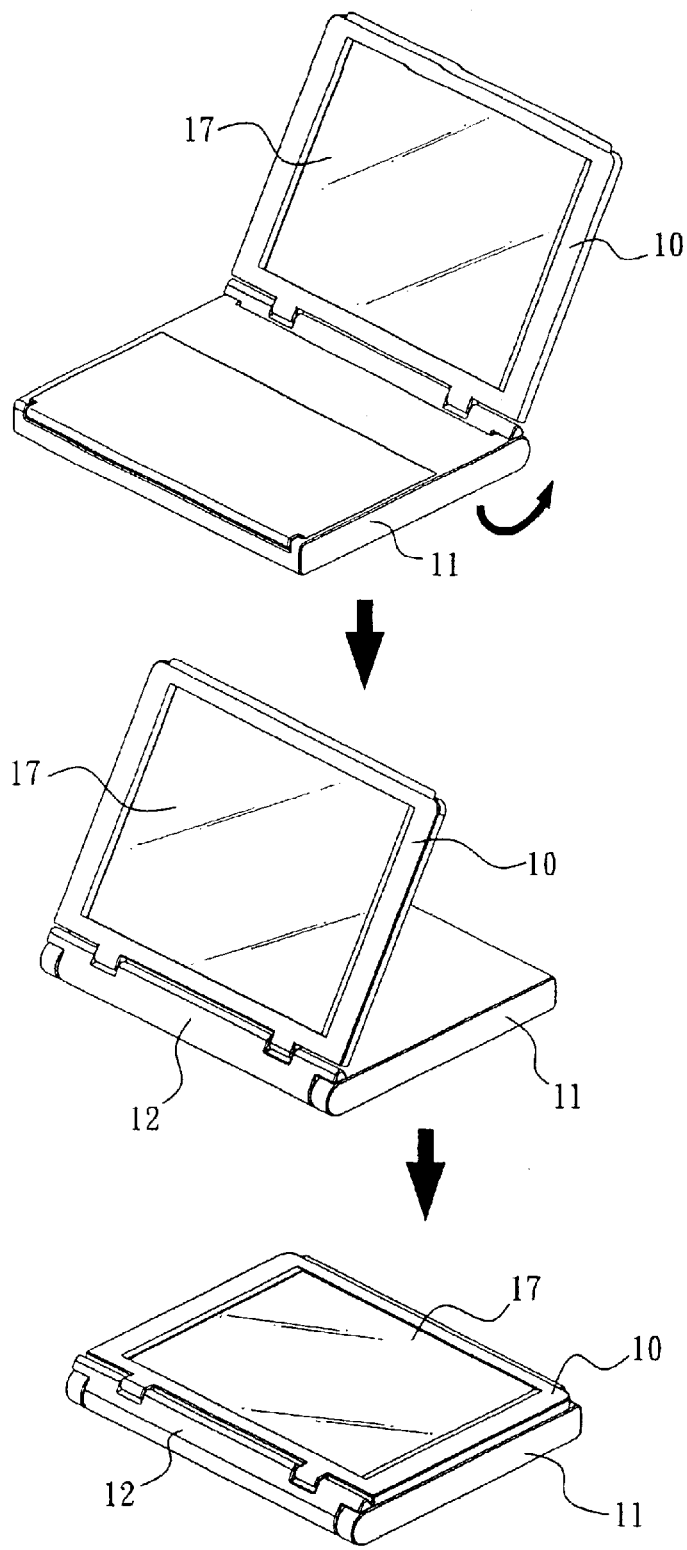
FIG. 3 is another perspective diagram illustrating the movement according to the present invention.
Figure 4A:
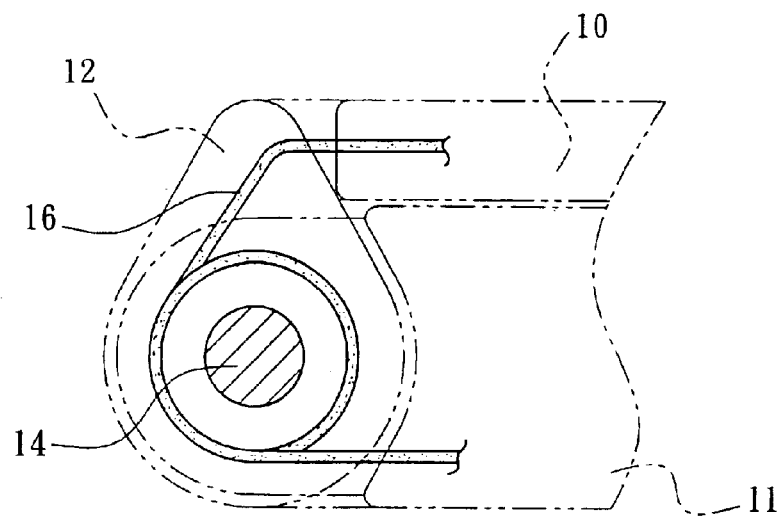
FIG. 4A is an illustrative planar diagram illustrating the movement of the present invention.
Figure 4B:
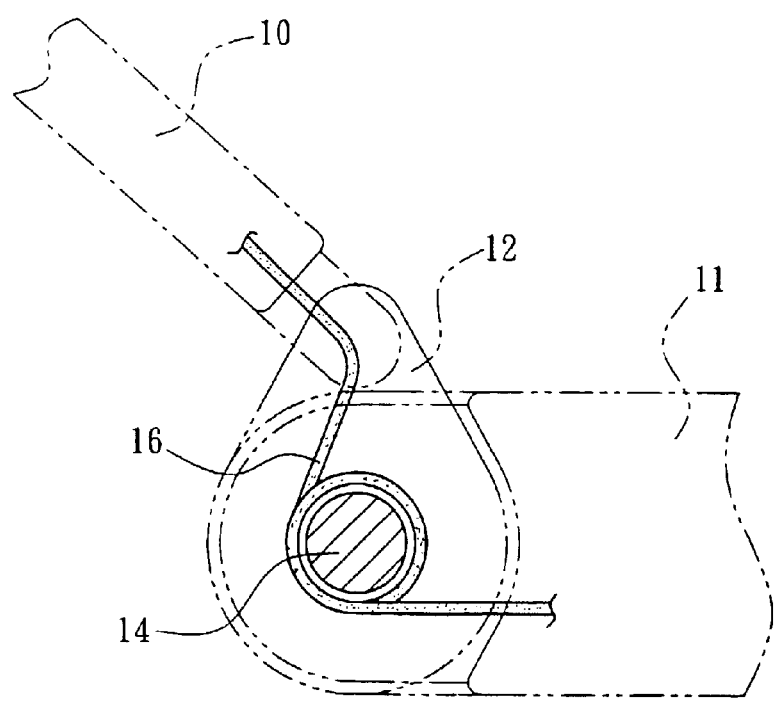
FIG. 4B is another illustrative planar diagram illustrating the movement of the present invention.

In the present invention, when the screen 17 of the monitor 10 is turned over gradually from an original status of being closed onto the main system 11 (as shown in FIG. 2) away from the main system 11 until the monitor 10 is in a status back-to-back stacked on the main system 11 (as shown in FIG. 3). In this turnover procedure, each communication cable 16 is coiled onto each upper and lower pivots 13, 14 (see FIG. 1) and the status of coiling from the loosest status (please refer to FIG. 4A for the illustrative diagram of the loosest status of coiling the communication cable 16 onto the lower pivot 14 while the monitor 10 is closed onto the main system 11) to a tightly coiled status (please refer to FIG. 4B for the illustrative diagram of the tighter status of coiling the communication cable 16 onto the lower pivot 14 while the monitor 10 is opened away from the main system 11) as the angle of turnover increases. Therefore, the turnover between the monitor 10 and the main system 11 only let the communication cable 16 be coiled onto the upper and lower pivots 13, 14 to different extents, but it will not affect or obstruct the position and angle of the turnover. Furthermore, it also will not cause communication cable 16 to have fast knot, be pulled apart, or broken by clipping during the turnover process.

Since the connecting body 12 is used as the main turnover mechanism of the 360-degree turnover between the main system 11 and the monitor 10. Therefore, the position of pivotally connecting the connecting body 12, the main system 11, and the monitor 10 is kept in an appropriate tightness to avoid the monitor 10 from being turned automatically to close onto the main system 11 due to the weight of the monitor 10 after the monitor 10 has been turned over to an appropriate position away from the main system 11. The way of controlling the tightness of the pivotal connection between the connecting body 12, the main system 11, and the monitor 10 is a prior-art technology that has been used for a long time, and is not the key point of the present invention, and thus will not be described here.

Please refer to FIGS. 2 and 3 for the input device disposed on the main system 11 of the present invention. According to the traditional design concept, a keyboard is embedded on one side of the screen 17 facing the main system 11. Since the present invention emphasizes on the free turnover between the main system 11 and the monitor 10, therefore it will produce different relative positions and using angles. For certain status of application of the present invention (for example, the screen 17 faces the back of the main system 11) may cause the keyboard to be pressed onto the desktop, not only making the setup of the main system on the desktop unstable and shaking, but also making the press keys on the keyboard to press the desktop for a long time and causing the elastic member of the press keys inelastic due to the long-term pressing. In view of these shortcomings, the present invention adopts an excellent design concept to set an accommodating groove 18 on the main system 11 (refer to FIG. 5). The accommodating groove 18 can be installed exactly into a hidden keyboard 19, and the hidden keyboard 19 is coupled to the main system 11 by means of a pivot member 15 each on both ends of one side of the keyboard 19, so that a press key surface of the hidden keyboard 19 faces the bottom of the accommodating groove 18 at regular time. When users want to operate the hidden keyboard 19, the hidden keyboard can be rotated 180 degrees to turn over outward from the accommodating groove 18 to expose the press key surface.

Figure 5:
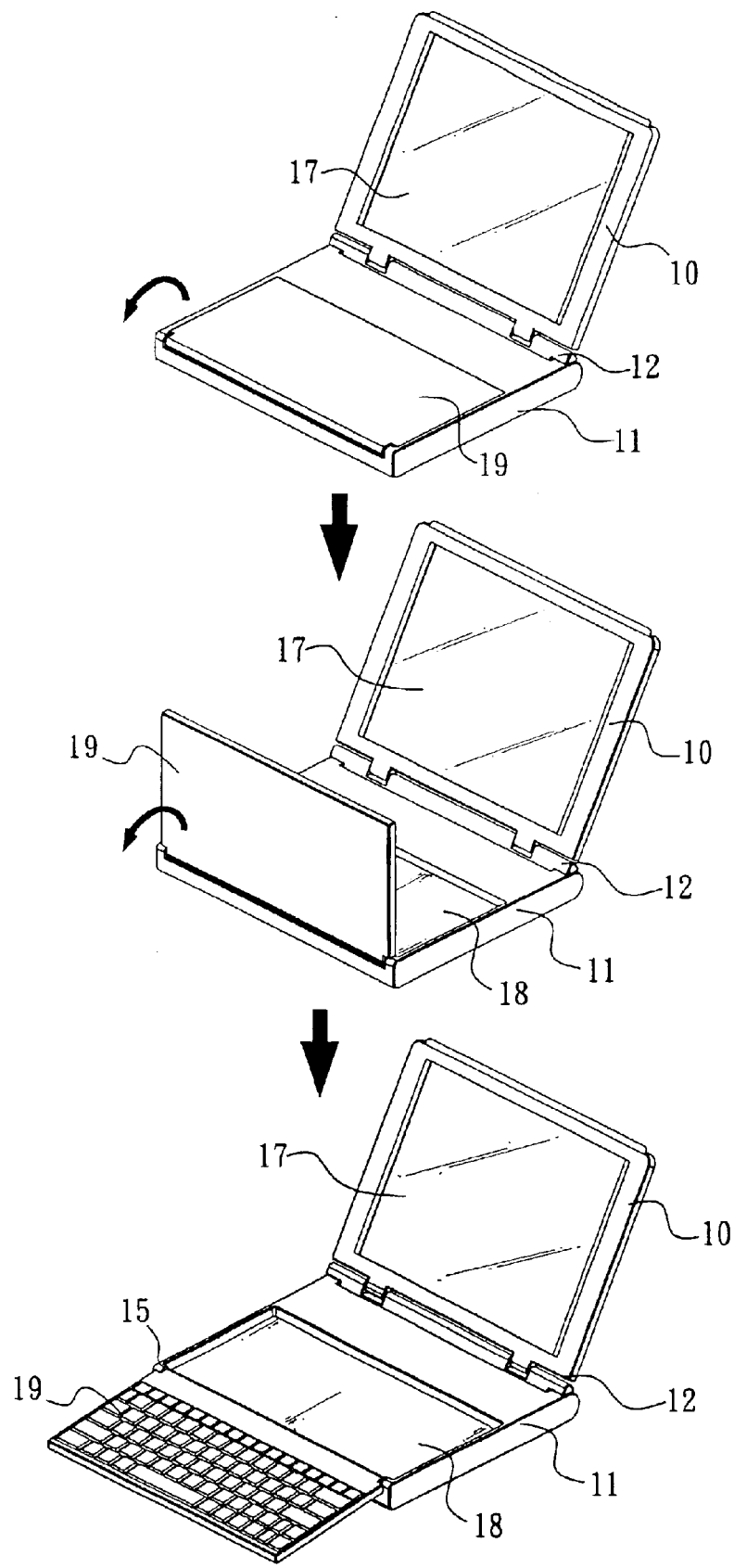
FIG. 5 is a perspective diagram of present invention when it is in use.

Please refer to FIGS. 1 and 5 for the present invention. Each communication cable 16 is a soft parallel cable, and its soft and bendable feature facilitates its coiling onto each upper and lower pivot 13, 14. In addition, a film of mylar can be added onto the surface of the communication cable 16 to strengthen the tenacity of the communication cable, where in at least another one communication cable is disposed between the hidden keyboard 19 and the main system 11.

What is claimed is:

1. A hinge assembly for a notebook computer comprising:
   a) a monitor having a screen;
   b) a main system;
   c) a connecting body located between the monitor and the main system;
   d) at least one upper pivot pivotally connecting two ends of a first side of the connecting body to two ends of the monitor;
   e) at least one lower pivot pivotally connecting two ends of a second side of the connecting body to two ends of the first end of the main system, the monitor being movable between open and closed monitor positions;
   f) a hidden keyboard pivotally connected to a second end of the main system and movable between open and closed keyboard positions, the hidden keyboard having a press key surface; and
   g) at least one communication cable including a first communication cable spirally coiled around each of the at least one upper pivot and the at least one lower pivot, and connected at a first cable end to the monitor and at a second cable end to the main system.

2. The hinge assembly according to claim 1, wherein the main system has an accommodating groove, when the hidden keyboard is in the closed keyboard position, the hidden keyboard is located in the accommodating groove with the press key surface located adjacent to the main system.

3. The hinge assembly according to claim 1, wherein the keyboard pivots more than 180 degrees between the closed and the open positions.

4. The hinge assembly according to claim 1, further comprising two pivot members, the hidden keyboard is pivotally connected to the second end of the main system at each of two ends by one of the two pivot members, when the hidden keyboard is in the closed keyboard position, the hidden keyboard is located in the accommodating groove with the press key surface located adjacent to the main system.

5. The hinge assembly according to claim 1, wherein at least one communication cable includes a second communication cable connecting the hidden keyboard and the main system.

6. The hinge assembly according to claim 1, wherein each of the at least one communication cable is a soft parallel cable that is soft and bendable.

7. The hinge assembly according to claim 1, wherein each of the at lest one communication cable has a thin film of Mylar.

8. The hinge assembly according to claim 1, wherein, in the closed monitor position, the screen of the monitor is located adjacent to a top of the main system, and, in the open monitor position, a surface of the monitor opposite the screen is located adjacent to a bottom of the main system.

* * * * *